US010306405B2

(12) United States Patent
Persson et al.

(10) Patent No.: US 10,306,405 B2
(45) Date of Patent: May 28, 2019

(54) DETERMINING THE GEOGRAPHIC LOCATION OF A PORTABLE ELECTRONIC DEVICE

(71) Applicant: Sony Corporation, Tokyo (JP)

(72) Inventors: Magnus Persson, Flyinge (SE); Anders Berggren, Lund (SE); Lars Nord, Lund (SE); Peter C. Karlsson, Lund (SE)

(73) Assignee: SONY CORPORATION, Tokyo (JP)

(*) Notice: Subject to any disclaimer, the term of this patent is extended or adjusted under 35 U.S.C. 154(b) by 43 days.

(21) Appl. No.: 14/696,964

(22) Filed: Apr. 27, 2015

(65) Prior Publication Data
US 2016/0135007 A1 May 12, 2016

Related U.S. Application Data

(63) Continuation-in-part of application No. PCT/EP2014/074024, filed on Nov. 7, 2014.

(51) Int. Cl.
H04W 4/02 (2018.01)
H04W 24/10 (2009.01)
(Continued)

(52) U.S. Cl.
CPC ............ H04W 4/023 (2013.01); G01S 3/46 (2013.01); G01S 5/04 (2013.01); G01S 5/12 (2013.01);
(Continued)

(58) Field of Classification Search
CPC ..... H04W 4/023; H04W 4/027; H04W 24/10; H04W 88/08; H04W 4/10; H04W 36/30;
(Continued)

(56) References Cited

U.S. PATENT DOCUMENTS 5,502,450 A 3/1996 Zablotney et al.

6,374,311 B1 * 4/2002 Mahany ............... G06F 1/1626
710/18
(Continued)

FOREIGN PATENT DOCUMENTS

DE 102006037247 2/2008
WO 2011146011 A1 11/2011

OTHER PUBLICATIONS

L.M. Correia: Mobile broadband multimedia networks, Academic press (2006) chapter 6.6. Virtual antenna arrays of this type are thus unsuitable for use in portable electronic devices.
(Continued)

Primary Examiner — George Eng
Assistant Examiner — Hung K Du
(74) Attorney, Agent, or Firm — Tucker Ellis LLP

(57) ABSTRACT

Determining the geographic location of a portable electronic device (100) in a radio communications network, by transmitting radio signals from a plurality of first network transmitters (200, 300, 400); receiving, in the network, a measurement signal from the portable electronic device, which measurement signal comprises, for each transmitted radio signal, a plurality of data samples obtained in the electronic device from the respective transmitted signal at different time points during a measurement period with movement of the portable electronic device (100), and local position data associated to each data sample obtained from a local positioning unit in the electronic device, so as to form a synthetic antenna array; obtaining, a direction measurement between the electronic device and the first network transmitter from the synthetic antenna array; obtaining geographic location data for the first network transmitter; and identifying geographic location data of the portable electronic device based on the direction measurement and the geographic location data for the first network transmitter.

18 Claims, 7 Drawing Sheets

(51) Int. Cl.
   *H04W 88/08*   (2009.01)
   *G01S 5/12*   (2006.01)
   *G01S 5/04*   (2006.01)
   *G01S 3/46*   (2006.01)
   *G01S 5/00*   (2006.01)

(52) U.S. Cl.
   CPC ........... *H04W 4/027* (2013.01); *H04W 24/10* (2013.01); *G01S 5/0036* (2013.01); *H04W 88/08* (2013.01)

(58) Field of Classification Search
   CPC . H04W 36/32; H04W 36/08; H04W 36/0016; H04W 36/0055; H04W 16/28; H04W 64/00; G01S 5/0036; G01S 5/04; G01S 5/12; G01S 3/46
   See application file for complete search history.

(56) References Cited

U.S. PATENT DOCUMENTS

| | | | | |
|---|---|---|---|---|
| 2002/0033766 | A1* | 3/2002 | Pratt | G01S 19/21 342/357.63 |
| 2008/0100502 | A1* | 5/2008 | Jantunen | G01S 3/74 342/146 |
| 2008/0204322 | A1* | 8/2008 | Oswald | G01S 5/04 342/465 |
| 2013/0285855 | A1* | 10/2013 | Dupray | G01S 19/48 342/451 |
| 2014/0162704 | A1* | 6/2014 | Choi | G01S 1/08 455/456.6 |
| 2015/0005016 | A1* | 1/2015 | Palanki | H04W 4/027 455/456.6 |

OTHER PUBLICATIONS

Broumandan et al: "Direction of arrival estimation of GNSS signals based on synthetic antenna arrays", ION GNSS 2007, Sep. 25-28, 2007, pp. 1-11.

Merrill Ivan Skolnik: Introduction to Radar Systems, McGraw-Hill (2002), Chapter 1.1. The multi-path problem arises.when signal reflections generate further signal paths in addition to the direct signal transmission path between the mobile station and the stationary station.

* cited by examiner

DETERMINING THE GEOGRAPHIC LOCATION OF A PORTABLE ELECTRONIC DEVICE

CROSS-REFERENCE TO RELATED APPLICATION

This application is a continuation-in-part of International Application No. PCT/EP2014/074024, filed Nov. 7, 2014, the disclosure of which is hereby incorporated herein by reference.

TECHNICAL FIELD

The present invention relates to a technique for determining the geographic location of a portable electronic device, and in particular a technique that can be used as an alternative or supplement to well-known GNSSs (Global Navigation Satellite Systems) or an improvement to 3GPP triangulation.

BACKGROUND

Satellite navigation systems provide autonomous geo-spatial positioning with global or regional coverage. At the present, the dominating GNSS is the Global Positioning System (GPS). A GPS receiver has the ability to determine its geographic location (longitude, latitude, and altitude) to within a few meters using time signals transmitted along a line-of-sight by radio from satellites.

However, there are situations when it is not possible or even permitted for a portable electronic device with a GPS receiver to receive the satellite signals used for positioning. For example, satellite signals might be obscured or blocked when the handheld device is operated indoors, or in difficult urban areas with sky rises blocking the satellite signal. Still further, the GPS system might have inadequate coverage in a specific geographic area, or the satellite signals may be actively jammed to prevent positioning.

Furthermore, it may be desirable to have the option of providing positioning functionality to a portable electronic device without the need to incorporate a GPS receiver, which adds cost, space and energy consumption to the portable electronic device.

It is well-known that antenna arrays with several physical antenna elements (denoted "physical antenna arrays" in the following) can be used for directional estimation of incoming signals. A portable electronic device with a physical antenna array is e.g. disclosed in US2008/0100502. The portable electronic device estimates the direction of arrival of incoming radio signals when located at two different positions, by processing the incoming radio signals received from a signal source by the plural antenna elements at the first and the second position, respectively. Further, a built-in motion detector indicates the displacement vector between the first and second positions. The displacement vector in combination with the directions allows the portable electronic device to be positioned relative to the signal source.

One problem with physical antenna arrays is that they are large and bulky and usually consume more space than a portable electric device can afford. They may also require precise calibration, so that the response of each antenna element is known in all possible directions, in order to enable directional estimation.

In the field of antennas, there are also so-called virtual or synthetic antenna arrays which make use of robots to move a single physical antenna element to a number of known positions. The signals recorded at the different positions can be processed just as data from physical antenna arrays, as long as the surroundings of the antenna are sufficiently static during the measurement, and can therefore also be used for directional estimation. Like physical antenna arrays, virtual antenna arrays are bulky, mainly due to the need for a positioning device (usually some kind of robot or rail). Virtual antenna arrays are generally not developed with size constraints in mind, but are rather used to avoid the requirement for (the often cumbersome) calibration or to avoid coupling effects that may arise between the plural antenna elements of a physical antenna array, see e.g. L. M. Correia: Mobile broadband multimedia networks, Academic press (2006) chapter 6.6. Virtual antenna arrays of this type are thus unsuitable for use in portable electronic devices.

The prior art also comprises an article by Broumandan et al: "Direction of arrival estimation of GNSS signals based on synthetic antenna arrays", ION GNSS 2007, 25-28 Sep. 2007, pages 1-11. Broumandan discloses a technique for enhancing GNSS accuracy in urban environments, to reduce the influence of interfering signals generated by reflections of the incoming signals on buildings and other scattering objects in urban environments. This is achieved by determining the directions of the interfering signals and applying adaptive antenna algorithms to design a beamformer to place nulls in the directions of the interfering signals, thereby improving the signal quality of the GNSS signals used for global positioning. Broumandan proposes that an antenna array is synthesized by moving a handheld device with a single antenna in an arbitrary direction while continuously sampling the interference signal. The trajectory of the single array is determined by an inertial measurement unit (IMU) in the handheld device. The resulting set of spatial samples together with the trajectory form a synthetic antenna array, which can be processed for determining the direction of arrival for each interfering signal.

The prior art further comprises DE102006037247, which focuses on solving a multi-path problem in connection with time-of-arrival (TOA) or roundtrip-time-of-flight (TOF) positioning techniques, including GPS. The TOA and TOF techniques are based on obtaining measurement signals that represent the amplitude and phase of a transferred signal dependent on the transit time between a mobile station and each of a plurality of stationary stations. The measurement signals are used for calculating the distance to each stationary station based on the transit times in the same way as for conventional radar systems, see e.g. Merrill Ivan Skolnik: Introduction to Radar Systems, McGraw-Hill (2002), Chapter 1.1. The multi-path problem arises when signal reflections generate further signal paths in addition to the direct signal transmission path between the mobile station and the stationary station. DE102006037247 suggests solving this problem by generating a synthetic aperture which is designed to form a directionally exact antenna, so as to increase signal-to-noise and reduce the influence of signal reflections on the transit time estimates. It is well known that the resolution of an estimated transmit time is inversely proportional to the bandwidth of the signal; therefore the positioning in DE102006037247 requires a broadband radio signal to get adequate estimates of transit time. Furthermore, the positioning in DE102006037247 requires synchronization across all the stationary stations, or synchronization between the mobile station and each of the stationary stations.

Another type of single antenna direction-finding system is known from U.S. Pat. No. 5,502,450. Here, a single antenna is arranged on an aircraft to receive a signal from a source while the aircraft moves along a linear flight path. A system connected to the antenna detects periodically occurring symbols in the signal at two positions along the flight path and calculates, based on the corresponding signal transmit time, the distance to the source at each position. The distance between the positions along the flight path is determined using existing navigational means. Based on these distances and applying trigonometry calculations, the system is able to estimate the angle or the distance to the source at a downstream position along the linear flight path.

WO2011146011 A1 presented a self-positioning portable electronic device, which also need only one antenna element. In the proposed method, the electronic device receives a signal from one or more remote transmitters, and a local positioning unit determines a local position of the device. The device operates to obtain a plurality of data samples from the signal at different time points during a measurement period with movement of the portable electronic device along an arbitrary trajectory, associate each data sample with a local position obtained from the local positioning unit so as to form a synthetic antenna array, obtain an array response of the synthetic antenna array, and identify the geographic location of the portable electronic device, by processing the synthetic antenna array as a function of the array response and using knowledge about the geographic location of the transmitter. The use of the array response allows the geographic location to be identified independently of signal transit time between the transmitter and the device.

SUMMARY

It is an object of the invention to at least partly overcome one or more of the limitations of the prior art.

In view of the foregoing, one object is to provide a new positioning technique which is suitable from a resource point of view, for positioning of portable electronic devices, i.e. a technique for determining the geographic location of such portable electronic devices, as an alternative or supplement to the use of conventional GNSS or an improvement to 3GPP triangulation.

One or more of these objects, and further objects that may appear from the description below, are at least partly achieved by means of a method, a computer program product, a computer-readable medium and portable electronic devices according to the independent claims, embodiments thereof being defined by the dependent claims.

A first aspect of the invention is a method of determining the geographic location of a portable electronic device in a radio communications network. The method comprises the steps of: transmitting radio signals from a plurality of first network transmitters; receiving, in the network, a measurement signal from the portable electronic device, which measurement signal comprises, for each transmitted radio signal, a plurality of data samples obtained in the electronic device from the respective transmitted signal at different time points during a measurement period with movement of the portable electronic device, and local position data associated to each data sample obtained from a local positioning unit in the electronic device, so as to form a synthetic antenna array; obtaining, in the network, a direction measurement between the electronic device and the first network transmitter from the synthetic antenna array; obtaining geographic location data for the first network transmitter; and identifying geographic location data of the portable electronic device based on the direction measurement and the geographic location data for the first network transmitter The first aspect is based on performing the geographic positioning of the portable electronic device based on a directional estimation obtained by means of the synthetic antenna array. In one embodiment, e.g. by processing the synthetic antenna array as a function of the array response, the geographic location may be identified independently of signal transit time between transmitter and the portable electronic device. As noted above, although prior art techniques combine TOA or TOF techniques with a synthetic antenna array, this is not done for positioning, but for shaping and directing a synthetic aperture either towards transmitters to improve signal quality or to determine directions of interfering signals. In other words, in the prior art, the synthetic antenna array is used for obtaining data samples, whereas the inventive method uses the synthetic antenna array when processing the data samples for identifying the geographic location, specifically by processing the synthetic antenna array as a function of the array response. The array response may be seen as a model of the signal response at the local positions, in terms of at least the phase of the signal, and possibly also the amplitude of the signal, as a function of the relative location between the synthetic antenna array and the transmitter, while neglecting any differences in time delay between the local positions with respect to the transmitter.

In addition, the first aspect is based, on the one hand, on data collection in the electronic device, and on the other hand, calculation made in the network. This minimizes the processing and storage requirements of the portable electronic device, and provides an improved interface for other stakeholders, such as rescue services.

In one embodiment, the method is combined with receiving time difference data from the portable electronic device, representing time difference measured between specific signals from at least a number of second network transmitters; wherein the step of identifying the geographic location includes the step of combining a direction measurement between the electronic device and at least one of the first network transmitters, established from said array response, with said time difference data. In such an embodiment, the positioning bases on the synthetic array may thus be combined with e.g. an OTDOA (Observed Time Difference Of Arrival), a positioning feature introduced in 3GPP rel9 of E-UTRA, LTE.

In one embodiment, the steps of receiving a measurement signal and receiving time difference data are carried out independently from each other. These measurements may however still be carried out on the same signals, such as on PRS (Positioning Reference Signal), transmitted by base stations of a cellular LTE system.

In one embodiment, the steps of identifying the geographic location comprises the step of correlating geographic location information obtained from processing the synthetic antenna array, with geographic location information determined from said time difference data. In such an embodiment, an improved positioning accuracy may be obtained, compared to using only e.g. OTDOA.

In one embodiment, the first network transmitters are wireless access points, and the second network transmitters are cellular base stations. Alternatively, both the first and the second network transmitters may be cellular base stations.

In one embodiment, the array response is obtained in the form of a mathematical function that relates the signal response (phase and possibly amplitude at each of the local positions) to one or more parameters that represent the relative location between the synthetic antenna array and the transmitter. Such parameters may e.g. define a direction from the synthetic antenna array to the transmitter, a position of the synthetic antenna array in a coordinate system at the transmitter, or a position of the transmitter in a coordinate system of the portable electronic device. The step of identifying the geographic location may involve extracting the parameter value(s) that causes the mathematical function to (approximately) result in the data samples at the local positions. In other words, the mathematical function is optimized for the data samples at the local positions.

In another embodiment, the array response is obtained in the form of a set of signal responses for different relative locations between the synthetic antenna array and the transmitter, each signal response being represented as phase and possibly amplitude at each of the local positions. The step of identifying the geographic location may involve matching (correlating) the synthetic antenna array to the different signal responses, wherein the relative location is given by the best matching signal response among the set of signal responses.

The inventive method provides a number of technical advantages. For example, by using a synthetic antenna array, the signal receiving unit may be provided with a simple and space-efficient antenna. Further, by using the array response, the inventive method may be implemented without requiring any synchronization between the portable device and the transmitter(s), and/or between transmitters, if the signal is repeated and known to the portable electronic device. Furthermore, an arbitrary signal may be used since the positioning is independent of signal bandwidth. Thus, in contrast to the prior art, the inventive method also allows the use of a narrowband signal, i.e. a signal having a bandwidth $B \ll c_0/a$, where $c_0$ is the speed of light and a is the required spatial resolution of the system. It can be noted that the inventive method works well also when the signal is an unmodulated sinusoidal signal.

It is realized that the inventive method may be used as a replacement of, or a supplement to, conventional GNSS.

It should be emphasized that the step of identifying the geographic position may use additional information, including but not limited to compass information at the portable electronic device, an estimated direction of the gravitational force at the portable electronic device, and an estimated distance between the portable electronic device and the or each transmitter. The estimated distance may be obtained with any available technique, including the above-mentioned TOA and TOF techniques.

A second aspect of the invention relates to a portable electronic device, comprising a signal receiving unit including an antenna configured to receive a signal from at least one remote transmitter; a local positioning unit for determining a local position of the portable electronic device; and a processor, configured to obtain a plurality of data samples from the signal at different time points during a measurement period with arbitrary movement of the portable electronic device, associate each data sample with a local position obtained from the local positioning unit so as to form a synthetic antenna array, obtain an array response of the synthetic antenna array, and identify the geographic location of the portable electronic device, by processing the synthetic antenna array as a function of the array response and by using knowledge about the geographic location of the or each remote transmitter. Said antenna includes a plurality of antenna elements, wherein the processor is configured to obtain a plurality of data samples at each local position of the apparatus.

In one embodiment, the portable electronic device may comprise a sample timer function, configured to determine the speed or velocity of movement of the apparatus during the measurement period, and to control the sample period to target a predetermined distance between the measurement points.

Still other objectives, features, aspects and advantages of the present invention will appear from the following detailed description, from the attached claims as well as from the drawings.

BRIEF DESCRIPTION OF THE DRAWINGS

Embodiments of the invention will now be described herein by way of example only, with reference to the accompanying schematic drawings.

DETAILED DESCRIPTION OF EXEMPLARY EMBODIMENTS

Figure 1:
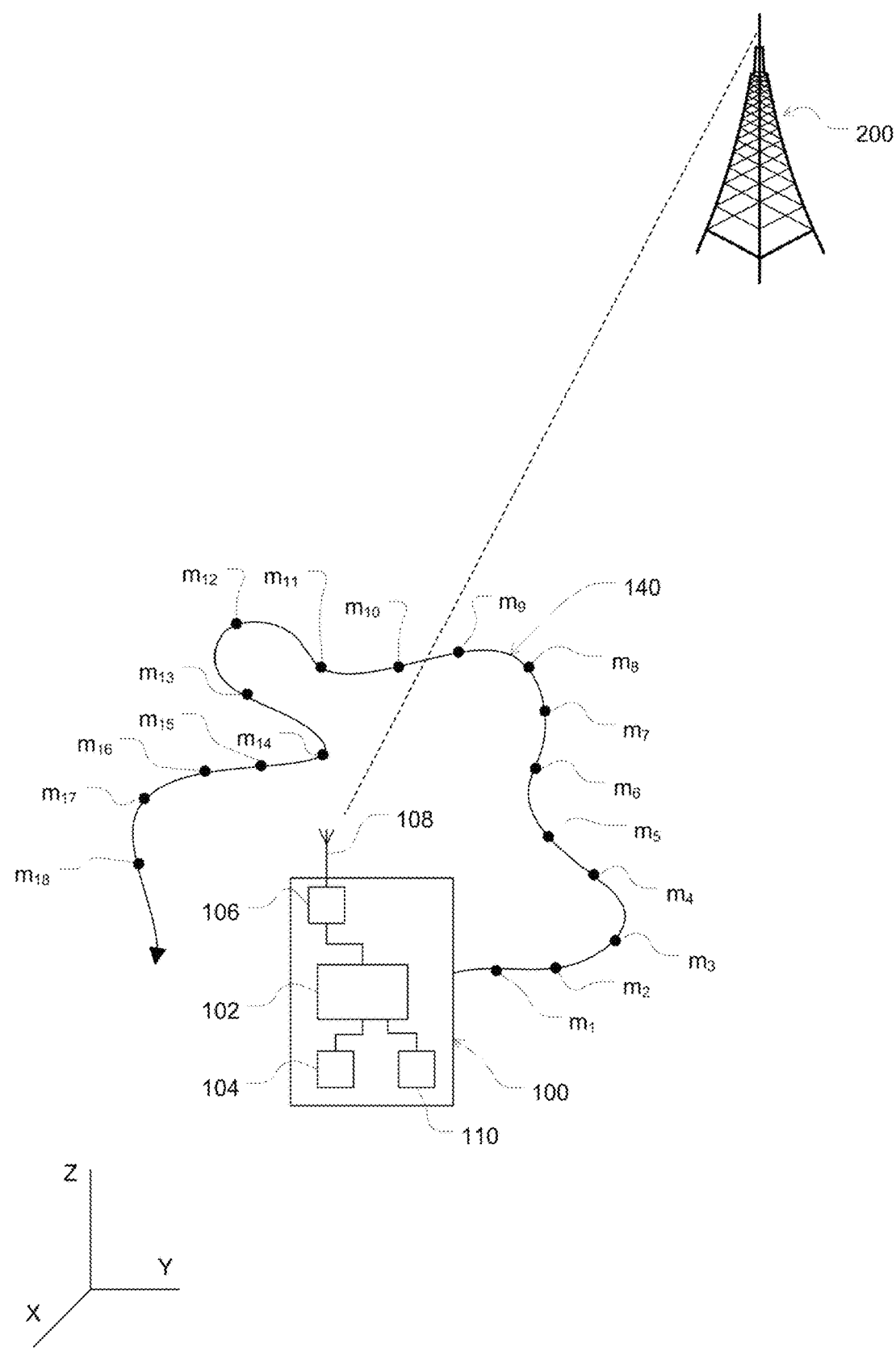
FIG. 1 is a block diagram of a portable electronic device enabling positioning according to an embodiment.

FIG. 1 is a schematic illustration of an implementation of a portable apparatus 100, typically in the form of a handheld electronic device, which is operable to receive a signal from a source 200. The signal is transmitted as electromagnetic waves that propagate from the source 200 to the apparatus 100, typically as radio waves or microwaves. Normally, the geographic location of the source 200 is not known to the apparatus 100. Generally, the source 200 is stationary, i.e. has a fixed geographic location.

The apparatus 100 includes a processor 102, a storage device 104, a receiver or transceiver 106, an antenna 108 and a motion detector 110. In combination, the components 102-110 may cooperate to obtain data that enables determination of the direction between the source 200 of the signal and the apparatus 100, and given the geographic location of the source 200 and possibly additional input as well as, it is possible to determine the geographic location of the apparatus 100 (in the global coordinate system XYZ). As will be explained in detail further below, the additional input may comprise information about a cardinal direction of a compass, the direction of the gravitational force, an estimated distance from the apparatus 100 to the source 200, or one or more additional estimated directions to one or more additional sources (not shown in FIG. 1). Each such additional estimated direction to an additional source may be determined in the same way as the direction to the source 200. Alternatively, the additional input may be obtained from a time difference measurement, of signals from one or more transmitters received in the apparatus 100.

In order to estimate the direction between the apparatus 100 and the source 200, the apparatus 100 is configured to obtain a data set by receiving and sampling the signal at different time points while the apparatus 100 and thus the antenna 108 is moved along a random three-dimensional trajectory 140, as indicated in FIG. 1. The sampling thus results in a set of spatial measurement points $m_1$-$m_{18}$, also indicated in FIG. 1. Each measurement point $m_1$-$m_{18}$ represents one or more properties of the signal, including at least the phase of the signal, and possibly the amplitude of the signal, as sampled at the respective time point. It is to be noted that the resulting set of measurement points $m_1$-$m_{18}$ does not need to be located in a spatially uniform pattern, but could be completely random. Concurrent with the sampling of the signal, positional data is obtained from the motion detector 110. Depending on the required accuracy, the positional data may indicate the relative or absolute location of the apparatus 100 in a local coordinate system, or the corresponding location of the antenna 108 (i.e. accounting not only for translation but also rotation of the apparatus 100), for each measurement point $m_1$-$m_{18}$. The local coordinate system is defined in relation to the apparatus 100 and has no predefined relation to the global coordinate system XYZ.

A measurement signal may thereafter be generated, and transmitted from the apparatus 100 to the network, typically to the currently serving base station or access point. For each transmitted radio signal, the measurement signal may comprise a plurality of data samples, such as $m_1$-$m_{18}$, obtained in the apparatus from the respective transmitted signal at different time points during a measurement period with movement. The measurement signal may also comprise local position data associated to each data sample obtained from a local positioning unit in the electronic device, so as to form a synthetic antenna array. Further processing of the sampled signal is then preferably performed in the network, such as in a node connected to the serving base station.

In the following, for explaining the processing of the sampled signal, reference is made to the theoretical framework presented by A. Richter in "Estimation of radio channel parameters: Models and algorithms", Ph.D. Dissertation, Technische Universität Ilmenau, Ilmenau, Germany (2005), which is incorporated herein in its entirety by reference.

By associating each measurement point $m_1$-$m_{18}$ with a local position, it is possible to treat the resulting data set as a synthetic/virtual antenna array, see e.g. A. Richter (2005), Chapter 3.3, and thus to process the data set by any one of a multitude of known directional estimation algorithms based on antenna array measurements, see e.g. H. Krim and M. Viberg: Two decades of Array Signal Processing Research, IEEE Signal Processing Magazine, pp 67-94, July 1996. Such directional estimation algorithms, commonly denoted DOA (direction of arrival) algorithms, enable directional estimation based on a data set of signal properties sampled at a sufficient number of spatially separated positions with sufficiently well-defined coordinates. Those samples can be measured either by a synthetic/virtual array or a physical array. Common to such DOA algorithms is that they define a function that relates the phase of the signal, and possibly the amplitude of the signal, at different positions to the direction of arrival of the signal at the antenna array. It should be noted that in the case of a synthetic/virtual array, a single antenna used does not need to be characterized in gain and phase response. This in contrast to physical arrays, where it may be important to know the variations between the individual antenna elements used. It is advantageous if the reference direction of a single antenna stays the same during the measurement interval, though this is not a strict requirement.

To further explain and exemplify the use of DOA algorithms, consider an antenna with a single antenna element 108 that is receiving a signal from a single source 200 in free space. The complex base band representation of the signal from the source transmitted at time instant $t_i$ is denoted $s(t_i)$. This complex base band signal may be an arbitrary signal, modulated or non-modulated ($s(t_i)=1$). Assume that the transmit filter has an impulse response $g_T(t)$ and the receive filter has an impulse response $g_R(t)$. The complex baseband representation of the received signal is then given by (see e.g. Richter (2005), Chapter 2.2):

$$r(t_i)=s(t_i-l_p/c_0)*g_R(t)*g_T(t)A\exp\{-j2\pi f_c l_p/c_0\},$$

where '*' denotes convolution, $c_0$ is the speed of light, $l_p$ is the electrical length of the propagation path, $f_c$ is the carrier frequency and A includes free space path loss and complex antenna gain. An equivalent frequency domain representation is given by:

$$R(f)=S(f)G_R(f)G_T(f)A\exp\{-j2\pi f\tau_p\}\exp\{-j2\pi f_c l_p/c_0\},$$

where $\tau_p=l_p/c_0$ is the time delay from the source to the receiver.

For time of arrival based methods, such as TOA and TOF, the time delay or relative time delay can be extracted from a single measurement of $r(t_i)$ by considering the impulse response (or any equivalent measure) of the channel that can be extracted by help of a transmitted broad band signal $S(f)$. One embodiment of the inventive method for positioning is not based on such time delays, but on the array response of the synthetic antenna array created when the antenna 108 is moved in a volume and the received signals are sampled at different positions (measurement points $m_1$-$m_{18}$). The "array response", which is a well-known term to the person skilled in the art, refers to the M×1 complex array response of the synthetic antenna array built up from the different measurement positions to a (unit-power) source in the direction (θ, φ), where θ, are the elevation and azimuth angles-of-arrival, respectively, from the source and M is the number of measurement points. Further details may be found in "Antenna Array Mapping for DOA Estimation in Radio Signal Reconnaissance" by P. Hyberg, Ph.D. Dissertation, Royal Institute of Technology, Stockholm, Sweden (2005), which is incorporated herein in its entirety by reference.

For small movements, e.g. occurring when the portable apparatus 100 is moved by its user, it is possible to neglect the changes in the delay $\tau_p$ between the measurement points, unless the observation bandwidth is really large. This is true if the movement is significantly smaller than $c_0/B$, where $c_0$ is the speed of light and B is the observation bandwidth, see Richter (2005), Chapter 2.2. It is further possible to decompose the array response, see Richter (2005), Chapter 2.4.2, into an element beam pattern shared by the antenna element 108 in all its positions (measurement points) and a phase vector relating the positions (measurement points) within the synthetic antenna array to the phases of the array response.

As will be exemplified further, the array response (e.g. given by its phase vector) is used for determining the direction to the source 200 from the synthetic antenna array. Assume that the signal is measured at a local coordinate $x_i \in R^{3 \times 1}$. The frequency representation of the received signal may then be described by $$R(f)=S(f)G_R(f)G_T(f)A_0 \exp\{-j2\pi f \tau_p\}\exp\{-jk_{0n}x_i^T k_n\},$$

where $k_n = -[\cos \varphi_n \sin \theta_n \sin \varphi_n \sin \theta_n \cos \theta_n]^T$, $\theta_n$ and $\varphi_n$ are the elevation and azimuth angles-of-arrival, respectively, from the source 200, $k_{0n}=2\pi\lambda_n^{-1}$, $\lambda_n$ is the (carrier) wavelength of the signal from the source 200, and $\lambda_0$ represents the free space path loss and complex antenna gain including the reference phase at the origin of the local coordinate system. The position specific part of the array response is given by $\exp\{-jk_{0n}x^T k_n\}$, where x is a matrix representation of the locations of all measurement points in the local coordinate system. By estimating the local positions of the measurement points by help of the motion detector 110, it is possible to form the position specific part of the array response. With this antenna array response, considering the measured phase changes during the movement, it is possible to determine the direction to the source 200.

Given that there are enough sources available and that the locations of those sources are known, it is possible to determine the location (global position) of the receiving antenna. Note that the phase is indicative of the directions to the sources and that this technique does not depend on the time for the signal to travel from the source to the receiver. The technique thereby works for arbitrary signals $s(t_i)$ from the source. For multipath channels, which are predominant for wireless communication, it should be noted that there is one phase and amplitude term associated with each multipath component and it is the incoming angle of the multipath component that is estimated.

Since the resulting data set may be treated/processed as a synthetic/virtual antenna array, the apparatus 100 may be provided with a simple and space-efficient antenna 108, which does not enable directional estimation in itself, since the resulting data set is treated/processed as a synthetic/virtual antenna array as described above. Further, the embodiment in FIG. 1 enables determination of the geographic location of the apparatus 100 without requiring access to a GNSS, such as a built-in GPS receiver.

Figure 11:
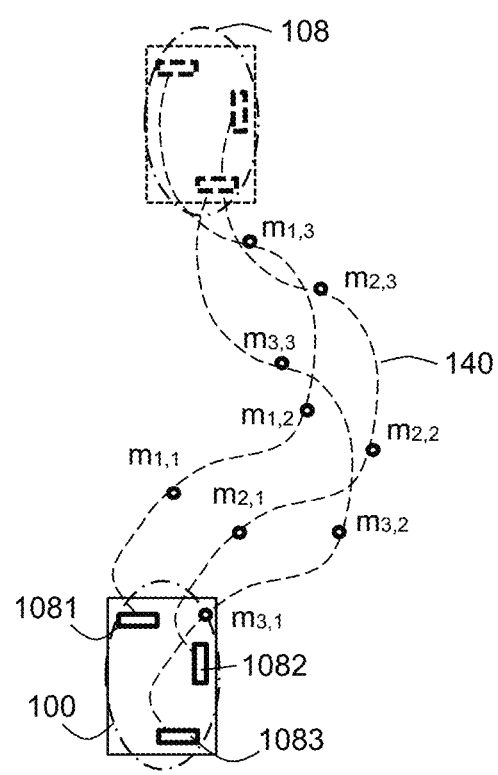
FIG. 11 schematically illustrates movement of an apparatus, so as to create a synthetic antenna array from a physical antenna array.

FIG. 11 shows an embodiment, in which a multi-element antenna is moved, so as to form the synthetic antenna array. In the embodiment described with reference to FIG. 1, the time sample separation in the synthetic array may correspond to the wavelength separation, dependent on the device movement v and carrier frequency fc. As an example for LTE, with fc=700 MHz, samples captured every 10 ms, and v=1 m/s, the distance between each sample point would be about $\lambda/4$, where $\lambda$ is the signal wavelength. However, due to restricted accuracy of the motion detector 110, an error in the local position determination between a first and second sample, will be added to another error in the local position determination between the second and a third sample, and so on. In one embodiment, as exemplified by the drawing of FIG. 11, this drawback is overcome by using a physical antenna array to form a synthetic antenna array. In this embodiment, antenna 108 comprises two or more antenna elements, such as 2, 3, 4, 5 or more. To use a multi-element physical antenna to sense direction has as such been described before. However, the inventors have realized that the inventive combination of a physical multi-element antenna with a synthetic/virtual array generated by movement, provides an improvement. For one thing, the movement to obtain a plurality of samples, as indicated in FIG. 1, provides a longer and more extensive spatial trajectory than any physical array confined in an apparatus 100 of compact size, such as a mobile phone, a computer, a surf pad, or similar. On the other hand, the positional relation between the elements of a physical antenna is much more precisely defined, by means of the mechanical structure, than the positions detected by a motion detector 110. This brings about an aggregate technical effect. Furthermore, multi-element antennas are more robust for a large range of frequencies fc=700 MHz to 30 GHz.

In the embodiment of FIG. 11, the apparatus 100 comprises a multi-element physical antenna 108 including three antenna elements 1081, 1082, 1083. In this drawing, the antenna 108 is indicated by means of a dash-dotted encircling of the antenna elements 1081, 1082, 1083. In order to estimate the direction between the apparatus 100 and a source (not shown), the apparatus 100 is configured to obtain a data set by receiving and sampling a signal from the source at different time points while the apparatus 100 and thus the antenna 108 is moved along a random three-dimensional trajectory 140, as indicated in FIG. 11. In the drawing, this is illustrated by respective trajectories for the antenna elements 1081, 1082, 1083, in the form of dashed lines. The sampling thus results in a set of spatial measurement points, similar to the embodiment of FIG. 1. However, for this embodiment, three samples $m_{1,x}$, $m_{2,x}$, $m_{3,x}$ are obtained in each position of the apparatus 100. Had the apparatus comprised e.g. four antenna elements, four samples would have been obtained in each measurement point. Each measurement point represents one or more properties of the signal, including at least the phase of the signal, and possibly the amplitude of the signal, as sampled at the respective time point, for the respective antenna element 1081, 1082, 1083. The sampling through the different antenna elements 1081, 1082, 1083 may be executed simultaneously, or e.g. cyclically. Otherwise, further features described with reference to FIG. 1 apply also to the embodiment of FIG. 11. For the sake of simplicity, these features and elements (102, 104, 106, 110) shown for apparatus 100 in FIG. 1, are not set out in FIG. 11, nor is the description thereof repeated with reference to FIG. 11. However, it will be understood that sampling can be made at fewer local positions with the embodiment of FIG. 11, while still collecting as many samples, compared to a single antenna solution, such as the one in FIG. 1. Also, determination of the local position (and spatial rotational orientation) of the apparatus 100 when taking the samples, will be improved with respect to a single antenna solution, since the relative distance and orientation of three sample points will always be given, within the accuracy of the mechanical structure of the apparatus. Or, conversely, with the same sample frequency, collecting three samples per cycle rather than one, means that more samples are collected for a given time period. This may result in a richer data set to subsequently calculate the direction from.

A measurement signal may thereafter be generated, and transmitted from the apparatus 100 to the network, typically to the currently serving base station or access point. For each transmitted radio signal, the measurement signal may comprise a plurality of data samples, such as $(m_{1,1}, m_{2,1}, m_{3,1})$ to $(m_{1,3}, m_{2,3}, m_{3,3})$, obtained in the apparatus from the respective transmitted signal at different time points during a measurement period with movement. It may be noted that more than three sample periods may be carried out, whereby each sample period will render another set of three samples. The measurement signal may also comprise local position data associated to each data sample obtained from a local positioning unit in the electronic device, so as to form a synthetic antenna array. Further processing of the sampled signal is then preferably performed in the network, such as in a node connected to the serving base station.

It is also conceivable to combine the embodiments in FIGS. 1 and 11, respectively, with a GNSS. For example, the apparatus 100 may include a GPS receiver (not shown), whereby the apparatus 100 may be operated in accordance with the inventive concept to provide navigational data whenever the GPS receiver fails to receive the required satellite signals or fails to determine a geographic location based on these satellite signals.

It is also conceivable to use the navigational data provided by the inventive positioning system to supplement the output data of conventional positioning systems, e.g. to reduce the impact of error propagation in such output data. Such conventional positioning systems exhibiting problems with error propagation include step counters and pedometers.

The data set may be collected after first instructing the user of the apparatus 100 to manually impart the random movement to the apparatus 100. The user may be instructed via any form of user interface (not shown) on the apparatus 100, e.g. a loudspeaker or a display screen. For example, the user may be instructed to wave the apparatus 100 in the air. Alternatively, the data set may be collected based on "natural" user movements, e.g. while the apparatus 100 is carried around by the user or while the apparatus 100 is located in a moving vehicle.

In one embodiment, the apparatus 100 is configured to take into account that the speed of the movement is not predetermined In this embodiment, a sample timer function is functionally included in the apparatus 100, e.g. in the processor 102. Samples taken with a distance of λ between each other or not useful for the synthetic antenna array. Therefore, the sample timer function is configured to determine the speed, or velocity, of movement of the apparatus during the measurement period. This may be determined by means of a motion detector 110. The sample timer function is further configured to control the sample period to target a predetermined distance between the measurement points, e.g. in the region of λ/4 of the frequency of the signal measured. This embodiment may apply both to a single antenna solution, and to an apparatus with plural physical antenna elements.

The apparatus 100 (its receiver/transceiver 106) should be coherent with the source 200 during the measurement period such that only minimal frequency drift is allowed between the source 200 and the receiver/transceiver 106. In other words, all phase and amplitude variations of the received signal over the different measurement points should be predominantly or exclusively caused by the movement of the apparatus 100. The signal may be a repeated signal, i.e. a known or unknown signal transmitted at some specific time instants, and/or a signal known to the apparatus 100 but not necessarily repeated. The important aspect is that the apparatus 100 is able to distinguish the phase and amplitude variations caused by the movements from those caused by the transmitted signal. Furthermore, the signal may be broadband or narrowband since transmit times are not used for the directional estimate. If the signal is repeated and has a given coherence time, the apparatus 100 may be configured to actively set the measurement period not to exceed this coherence time. The coherence time of an electromagnetic signal is the time over which a propagating wave may be considered coherent, i.e. it is the time interval within which its phase is predictable. It is conceivable that the apparatus 100 (the receiver/transceiver 106) is actively synchronized with the remote source 200 before and/or during the measurement period.

It is currently believed that an adequate accuracy of the estimated direction of the source 200 (or alternatively, the geographic location of the apparatus 100) is obtained for a data set containing at least 3 measurement points, and preferably at least 8 measurement points, at least 20 measurement points or at least 30 measurement points. Apart from the computational complexity, and the bandwidth required for sending the data to the network for processing, there is no upper limit for the number of measurement points acquired during a measurement period. It is well known that the variance of the directional estimate decreases when the antenna array aperture is increased, see e.g. Richter (2005), Chapter 3.3. Usually the aperture is between one and up to a couple of wavelengths, but it may be smaller as well as considerably larger.

Generally, each measurement period is dedicated to sampling of the signal originating from a specific source 200. Thus, if the apparatus 100 is to receive signals from plural sources, the apparatus initiates one measurement period for each source. However, from the user's perspective this sequence of measurement periods could be merged into one session for navigational positioning of the apparatus. If the hardware of the apparatus 100 allows it, the measurements of several sources may be performed in a parallel fashion as well.

Returning to the example in FIG. 1, the processor 102 is connected to receive an input from the motion detector 110. The motion detector 110 may be, for example, an inertial measurement unit (IMU), which may include a three dimensional accelerometer configured to detect translation of the apparatus 100 in any direction. The IMU may, for example, also comprise a magnetometer and/or a gyrometer for detecting rotation of the apparatus. Alternatively, the motion detector 110 may be based on any other available technology for relative or absolute positioning, including but not limited to odometers, laser based rangefinders (provided by e.g. Hokuyo Automatic Co, Ltd), ultrasonic rangefinders (e.g. by Maxbotics Inc), camera based positioning, either based on single (e.g. by Mesa Imaging AG) or multiple cameras (e.g. by NASA) or by a camera replacing the IMU, operating with Simultaneous localization and mapping (SLAM). As noted above, these elements may also form part of the apparatus of the embodiment shown in FIG. 11.

The processor 102 may be any type of processing circuitry. For example, the processor 102 may be a programmable processor that interprets computer program instructions and processes data. Alternatively, the processor 102 may be, for example, programmable hardware with embedded firmware. The processor 102 may be a single integrated circuit or a set of integrated circuits (i.e. a chipset). The chipset may be incorporated within a module, which may be integrated within the apparatus 100, and/or may be separable from the apparatus 100. The processor 102 may also be a hardwired, application-specific integrated circuit (ASIC).

The processor 102 is connected to receive an input from the receiver/transceiver 106. The receiver/transceiver 106 may be operable to receive the above-mentioned signal(s), and to transmit other signals, such as the measurement signal. The receiver/transceiver 106 is connected to the antenna 108. In one embodiment, the antenna 108 has a single antenna element for receiving the signal(s). In another embodiment, such as the one shown in FIG. 11, the antenna 108 may comprise a number of antenna elements 1081, 1082, 1083. The processor 102 is also connected to read from and write to the storage device 104. The storage device 104 is, in this example, operable to store computer program instructions, and may be a single memory unit or a plurality of memory units. If the storage device 104 comprises a plurality of memory units, part or the whole of the computer program instructions may be stored in the same or different memory units.

The computer program instructions stored in the storage device 104 control the operation of the apparatus 100 when loaded into the processor 102. The computer program instructions provide the logic and routines that enable the apparatus 100 to perform the steps performed therein of the methods illustrated in FIGS. 2 and 4, and described below. The computer program instructions may arrive at the apparatus 100 via an electromagnetic carrier signal or be copied from a physical entity such as a computer program product, a memory device or a record medium such as a CD-ROM or DVD.

Figure 2:
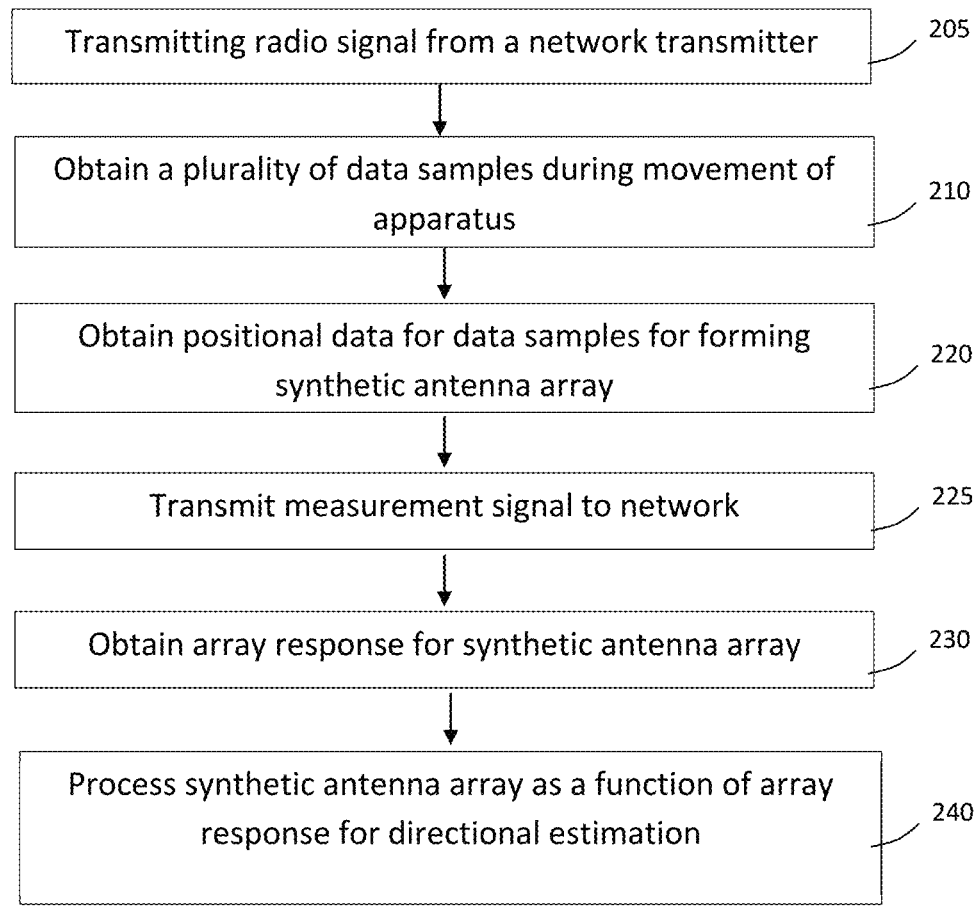
FIG. 2 is a flowchart of a method for operating the device in FIG. 1.

FIG. 2 is a flow chart of an exemplifying method for positioning of the apparatus of FIG. 1 or 11. In this embodiment, at step 205, radio signals are transmitted from one or more network transmitters, which signals are received in the apparatus 100. At step 210 in FIG. 2, the apparatus 100 is operated to obtain a plurality of data samples from the signal at different time points during the measurement period with arbitrary movement of the apparatus 100. Depending on implementation, the data samples may be extracted from the signal by either the receiver/transceiver 106 or the processor 102, or a combination thereof. As indicated above, each data sample represents the phase of the signal, and may also represent the amplitude of the signal. At step 220, the apparatus associates each data sample with a local position obtained from the motion detector 110 for forming a synthetic antenna array. In one embodiment, the formation of the synthetic antenna array is performed by the processor 102, which obtains the positional data for each data sample from the motion detector 110. In another embodiment, the formation of the synthetic antenna array is performed later, in the network. At step 225, a measurement signal is transmitted from the apparatus 100 to the network, preferably via the access point or base station currently serving the apparatus 100. At step 230, the array response of the synthetic antenna array is obtained. At step 240, the synthetic antenna array is processed as a function of the array response obtained in step 230, to identify the relative location of the apparatus 100 and the source 200 (e.g. given by the direction to the source 200), and identifies the geographic location of the apparatus 100 using the relative location and the known geographic location of the source 200. Below follows a detailed example of one embodiment. Reference will be made to reception of GSM signals, i.e. the apparatus 100 is a mobile communications terminal adapted for communication over a GSM system. However, reference is also made to LTE, in particular for certain specific embodiments. I is to be understood that the illustrated embodiment is not limited to neither GSM nor LTE systems, though, but the mobile communications terminal could operate on signals from any type of available source with a known geographic location, including wireless access points (WAP) for local area networks (e.g. the IEEE 208.11 family), base stations (BS) for any type of cellular system (e.g., GSM, W-CDMA, WiMAX, IS-95, CDMA2000, D-AMPS, EV-DO), as well as dedicated transmitters.

Figure 3:
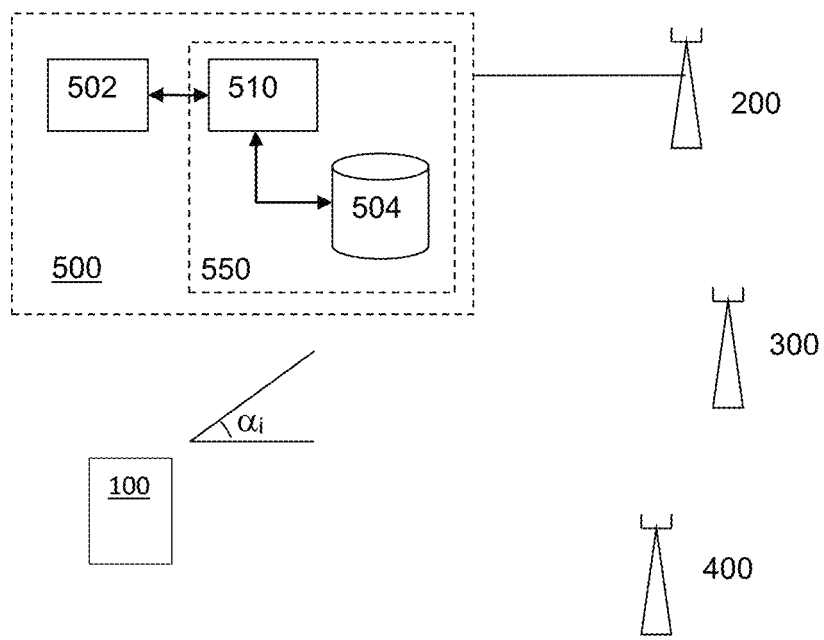
FIG. 3 is a block diagram of a positioning system on a mobile phone according to an embodiment.

FIG. 3 is a block diagram of a positioning system 500 for obtaining the location of a mobile communications terminal 100. The positioning system 500 is employed in one or more entities connected to a network of transmitters 200, 300, 400, and operates in cooperation with a terminal 100 to be positioned. For the purpose of wireless communication, the positioning system 500 is connected to a network transmitter and receiver 200, which in turn includes an antenna. For the example of an embodiment in LTE, the positioning system 500 may include or form part of a location server LS, and the network transmitter 200 may be an eNodeB 200. In such an LTE embodiment, the positioning system 500 may be connected to the eNodeB 200 via an MME (Mobility Management Entity), and may include an E-SMLC (Evolved Serving Mobile Location Center). In any instance, the positioning system 500 may comprise a transceiver unit 502 for communication with the network transmitters 200, 300 300, and a controller 550. In the controller 550, there is a processor 510, e.g. a CPU, and a storage device 504 comprising computer code, and a database of base stations and their geographic locations (e.g. GPS coordinates), and possibly also the frequencies they are using. In an alternative embodiment, such geographic location data for the network transmitters is stored remotely in the network, and is retrieved by data communication when needed.

Figure 4:
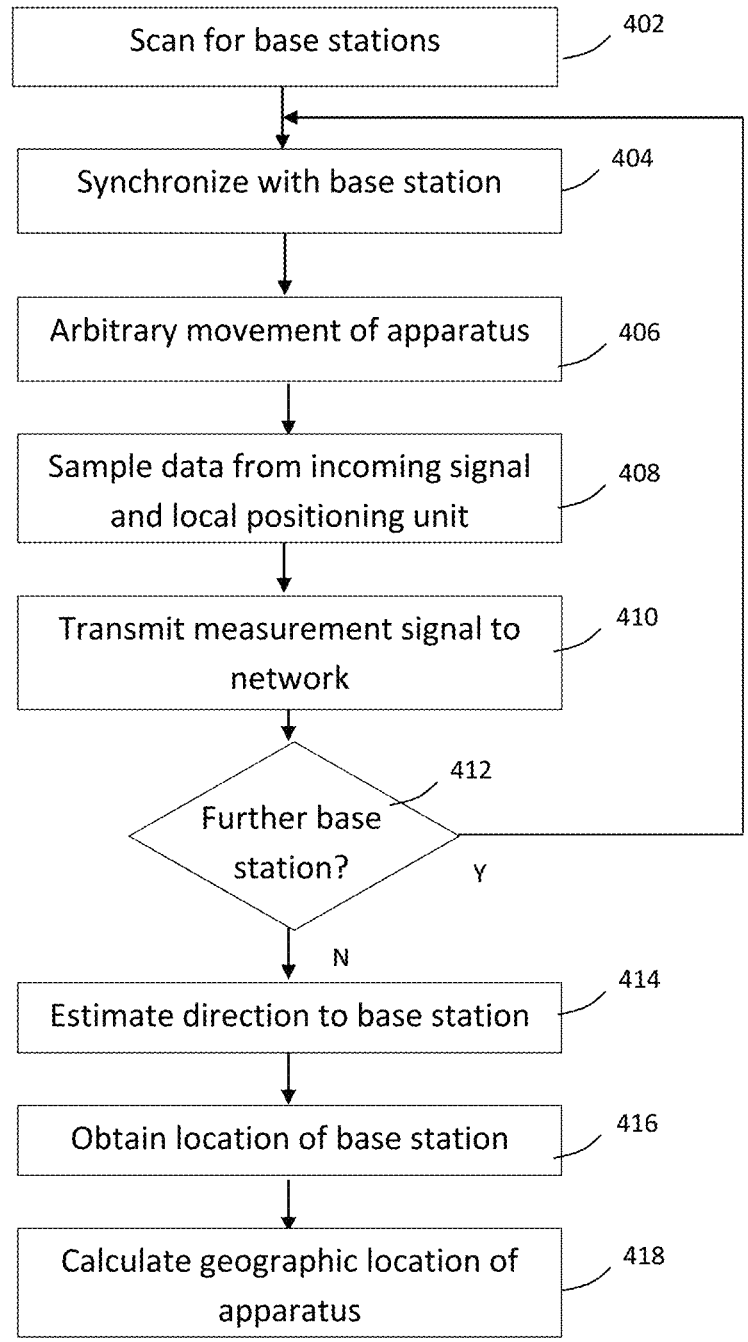
FIG. 4 is flowchart of a method for operating the device in FIG. 3.

FIG. 4 is a flowchart to exemplify the operation of the positioning system 500 in FIG. 3, in cooperation with the apparatus 100 to be positioned. The apparatus 100 may initially scan the frequency spectrum for available base stations in step 402. This process normally forms part of standard behaviour in cellular networks, for the purpose of handover preparation. However, dependent on the embodiment, the positioning of the apparatus 100 need not be based on the pilot signals otherwise used for signal strength measurements. As an exemplary alternative, the directional estimation may be carried out by making measurements on Position Reference Signals (PRS). In a GSM embodiment, the apparatus may measure a repeated signal, such as the synchronization sequence inside the GSM synchronization burst or the training sequence in a normal GSM burst. The process flow may continue with a step of ensuring that the apparatus 100 to position is subjected to an arbitrary movement during the directional estimation. This may be effected by outputting instructions to the user via a user interface. Alternatively, step 404 may be replaced or supplemented by a step of monitoring the output signal of the motion detector 110 to verify that the apparatus 100 is in adequate motion. However, rather than carrying out that step before synchronization with a base station, it may be carried out after synchronization, which is the embodiment shown in the example of FIG. 4.

For each identified base station 200-400, the apparatus 100 executes a sequence of steps 404-410 that collectively define a measurement period. In step 404, the system locks the RF processing unit 106 of the apparatus 100 to the base station frequency of a first base station 200 to get coherent reception, unless this step has already been carried out, e.g. if base station 200 is the currently serving base station. For the example of GSM this may be done by listening to the frequency correction channel (FCCH) in and correcting any frequency offset between the local oscillator in the RF processing unit 106 and in the base station 200. The RF processing unit 106 may also find time synchronization by listening to the synchronization channel (SCH). Once time synchronization is established, the base station ID may be obtained, e.g. from the broadcast control channel (BCCH) in a GSM system.

In step 406, it is ensured that the apparatus 100 to position is subjected to an arbitrary movement during the directional estimation, as already outlined above.

Accordingly, the apparatus 100 is connected to and knows the ID of the base station, the RF processing unit 106 starts measuring the phase and amplitude variations of a repeated, usually known, signal when the antenna 108 is moved while the output signal from the local positioning unit 110 simultaneously is recorded so that the physical movement of the antenna 108 may be calculated between the measurement points and hence the local coordinates of the measurement points may be calculated (step 408). In this way the received phase and amplitude of the received signal is recorded in several random, but known, positions. Assuming that the environment is static and the only movement is that of the receiving antenna 108, the digital signal processing unit 102 may form a synthetic/virtual antenna array. Preferably though, the apparatus is configured to transmit a measurement signal to the network, typically via the serving base station, for further processing. This way, processing required for obtaining an estimate of the position of the apparatus is saved in the apparatus. As a consequence, the inventive method provides a method for positioning that requires less power in the apparatus 100 than other technologies.

The apparatus 100 then repeats steps 404-410 for each further base station 300, 400 identified in step 402 (step 412). Optionally, the apparatus 100 may limit the processing to a given number of base stations, e.g. a number deemed to result in a sufficient accuracy of the geographic location to be calculated in step 418. In one embodiment, measurements are only carried out for one base station 200, as is outlined with respect to the embodiment of FIG. 10.

For the or each base station, for which a measurement signal has been transmitted from the apparatus 100, an estimate of a direction between that base station and the apparatus 100 is then established. This may e.g. entail known DOA algorithms, e.g. beamforming techniques such as Bartlett beamforming or Capon beamforming, or known parameter estimation methods such as SAGE to estimate the direction $\alpha_i$ of the incoming signal (step 414). These techniques may presume that the received signal is a sum of plane waves, but there are also available techniques designed to handle near-field effects. This direction is often similar to the physical direction to the base station 200, but may vary due to obstructions of the signal path.

By carrying out the direction estimation in the network, it is possible to correlate or otherwise combine the geographic location information obtained from processing the synthetic antenna array with time difference measurements. In a preferred embodiment, OTDOA measurements carried out by the apparatus are also transmitted as a measurement signal to the network. In one embodiment, the samples measured for the synthetic antenna array and OTDOA measurements made on a PRS of the same base station may be collectively transmitted in one measurement signal. Alternatively, e.g. if these measurements are carried out on different signals, and/or with different timing requirements, these measurement signals 410 may be transmitted independently. When all iterations of steps 406-412 are completed, the system 100 has access to a set of directional estimates ($\alpha_i$) to the different base stations 200-400. In step 416, the geographic position of those base stations are obtained from memory storage 504.

Optionally, the digital signal processing unit 102 may also obtain compass information and/or the direction of the gravitational force, i.e. an indication about the orientation of the apparatus 100 in relation to the coordinate system of the geographic locations, and send it with the measurement signal (step 410). The compass information may, e.g., identify the direction of one of the cardinal directions of the compass. Such compass information may be obtained from a magnetometer or another type of magnetic sensor in the apparatus 100. The direction of the gravitational force may, e.g., be obtained by accelerometers.

Based on the available data (direction(s), and possibly distance(s) and/or compass information), the processor 510 estimates the geographic location of the apparatus 100 by means of triangulation (step 418). The estimated location may be derived as a position on a map where the available data has the best match to all available base stations 200-400. The estimated geographic location may be transmitted to the apparatus 100 for display to the user, or e.g. to a rescue service.

It should be realized that the inventive positioning system may be advantageously implemented on existing portable electronic devices, and in particular on radio communication devices such as mobile phones. When implemented on mobile phones, the positioning system may use the existing mobile communication infrastructure such as base stations, and involve only minor modifications of the mobile phones, typically by installing dedicated software. It should be noted that the directional estimation and positioning may be performed without support from the cellular network as long as the geographic locations of the surrounding base stations are known to the mobile phone. It should also be noted that many modern mobile phones have built-in accelerometer/gyrometer/magnetometer and/or cameras which may be used in the inventive positioning system.

By implementing the inventive positioning system in mobile phones, it is possible to fulfil existing and future legal requirements (e.g. in the U.S.) that mobile phones should enable automatic positioning, when making emergency calls, without access to a GNSS.

Figure 5:
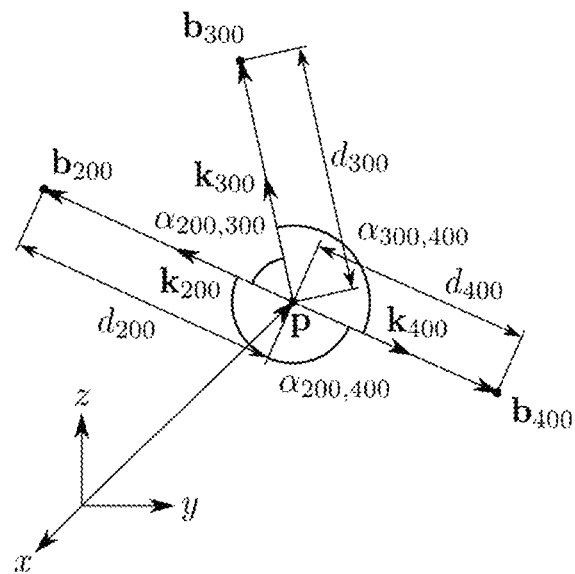
FIG. 5 is a definition of coordinates and vector for positioning of a portable electronic device once angle-of-arrival estimates are known.

The triangulation step 418 (FIG. 4) will now be further exemplified with reference to FIG. 5, which illustrates the system 100' in a global Cartesian coordinate system, after determination the directions-of-arrival to N sources (base stations). The task is now to determine the geographic location of the system 100' given by $p=[p_x\, p_y\, p_z]^T$ where $[\bullet]^T$ denotes the transpose operation. The directions of arrival from source n in the azimuth and elevation planes, $\varphi_n$ and $\theta_n$, respectively, are related to the direction vector $k_n$ by $$k_n = [\cos\varphi_n \sin\theta_n\; \sin\varphi_n \sin\theta_n\; \cos\theta_n]^T$$

which may be related to p and the position of source n, whose coordinates $b_n = [b_{nx}\, b_{ny}\, b_{nz}]^T$ are known to the system 100', by $$k_n = \frac{b_n - p}{d_n}$$

where $d_n$ is the distance between p and source n given by $$d_n = \sqrt{(b_n - p)^T (b_n - p)}.$$

If the system 100' does not know its rotation relative the global coordinate system, it does not know $k_n$ explicitly, but only the angle $\alpha_{mn}$ between each two direction vectors $k_m$ and $k_n$, which is given by their scalar product as $$\cos\alpha_{mn} = k_m^T k_n$$

Note that $\alpha_{mn}$ is independent of the coordinate system.

Figure 6A:
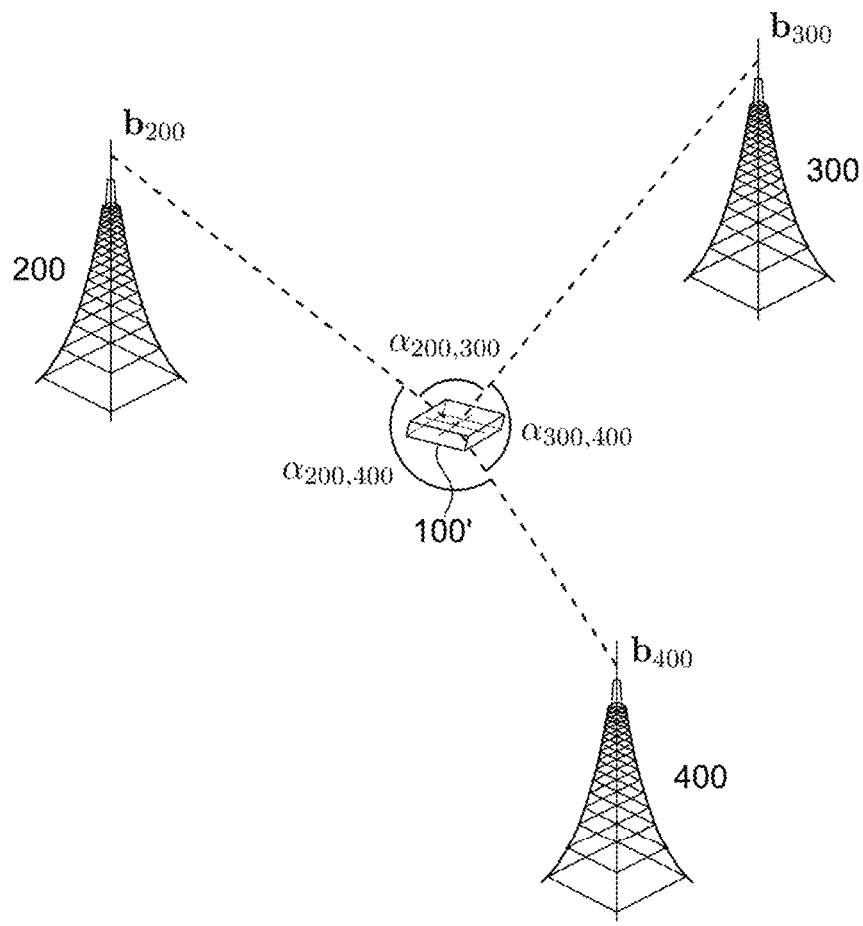
FIG. 6A-6C are diagrams to exemplify the required information for positioning when different number of sources are available.

If signals from three sources 200, 300 and 400 are available, as illustrated in FIG. 6A, the system 100' may estimate its position without knowing its rotation relative the global coordinate system, i.e., without explicit knowledge of the direction vectors $k_{200}$, $k_{300}$ and $k_{400}$. This is done by solving the equation system:

$$\begin{cases} \dfrac{(b_{200} - p)^T(b_{300} - p)}{\sqrt{(b_{200} - p)^T(b_{200} - p)(b_{300} - p)^T(b_{300} - p)}} = \cos\alpha_{200,300} \\ \dfrac{(b_{200} - p)^T(b_{400} - p)}{\sqrt{(b_{200} - p)^T(b_{200} - p)(b_{400} - p)^T(b_{400} - p)}} = \cos\alpha_{200,400} \\ \dfrac{(b_{300} - p)^T(b_{400} - p)}{\sqrt{(b_{300} - p)^T(b_{300} - p)(b_{400} - p)^T(b_{400} - p)}} = \cos\alpha_{300,400} \end{cases}$$

Figure 6B:
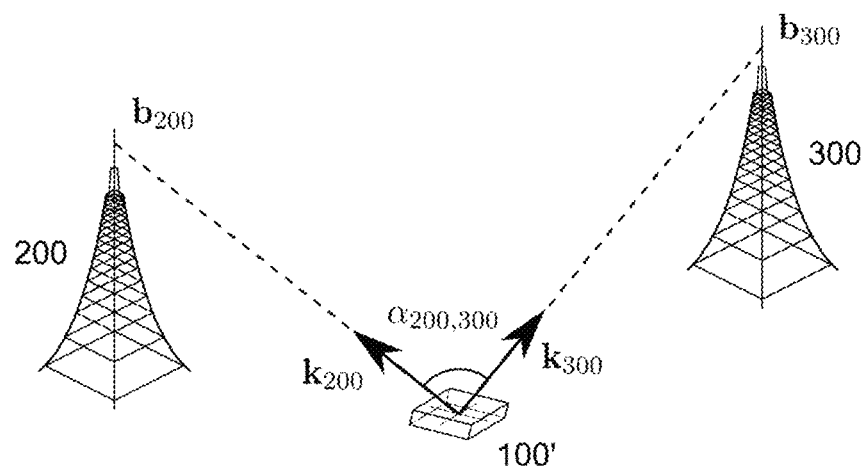

If signals from two sources 200 and 300 are available and the system 100' has access to compass information and the direction of the gravitational force, i.e., knows the direction vectors $k_{200}$ and $k_{300}$, as illustrated in FIG. 6B, the system 100' may estimate its position by solving the equation system:

$$\begin{cases} p - b_{200} + d_{200}k_{200} = 0 \\ p - b_{300} + d_{300}k_{300} = 0 \end{cases}$$

Note that the system 100' does not have to know the distances $d_{200}$ and $d_{300}$.

Figure 6C:
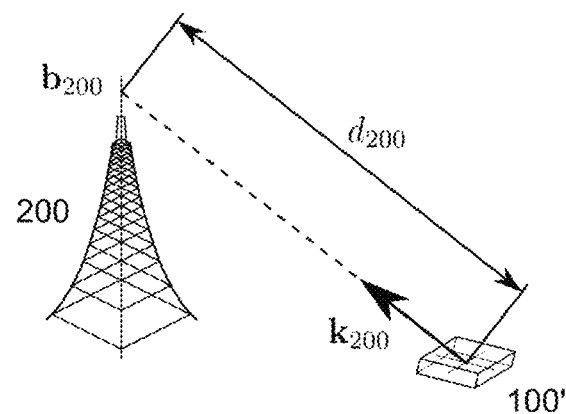

If the signal from a single source 200 is available, and the system 100' has access to compass information, the direction of the gravitational force, and knows the distance to the source, as illustrated in FIG. 6C, it can estimate its position by solving the equation:

$$p - b_{200} + d_{200}k_{200} = 0.$$

It is to be understood that the above examples indicate the required minimum number of sources. In a practical situation, it may be desirable to use an increased number of sources, e.g. to improve accuracy or robustness via redundancy in the positional estimation.

Looking now in more detail at techniques for estimating the geographic location based on estimated directions only, these techniques may be divided into two major categories: explicit triangulation and inherent triangulation.

Figure 7:
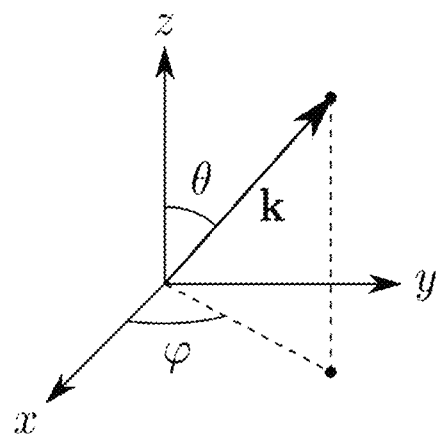
FIG. 7 is a definition of angles-of-arrival in elevation and azimuth.

In explicit triangulation, a cost function $f(\theta_n, \varphi_n)$ may be defined for each source (base station) n to include the directional estimation (DOA) algorithm (e.g. a synthetic antenna array algorithm), given as a function of the elevation angle ($\theta_n$) and the azimuth angle ($\varphi_n$), for the synthetic antenna array defined by the sampled data (e.g. phase and local position). The definition of the angles $\theta$, $\varphi$ for the direction vector k is given in FIG. 7. The cost function is minimized for the angles $\{\hat{\theta}_n, \hat{\varphi}_n\}$. Thus, for each source, the following optimization is executed:

$$\{\hat{\theta}_n, \hat{\varphi}_n\} = \underset{\theta_n, \varphi_n}{\mathrm{argmin}} f(\theta_n, \varphi_n)$$

The estimated direction to the source is given by $\hat{\theta}_i$. The geographic location of the apparatus is then estimated by minimizing another cost function $J(\hat{\theta}_1, \hat{\theta}_2, \ldots, \hat{\theta}_N)$, N being the number of available sources. The cost function J may be based on an explicit triangulation of the estimated direction, such that minimizing the cost function J finds the most likely intersection point for all estimated directions.

In inherent triangulation, a cost function $g(\theta_1, \varphi_1, \theta_2, \varphi_2, \ldots, \theta_N, \varphi_N)$ may be defined for all N sources to include the directional estimation (DOA) algorithm (e.g. a synthetic antenna array algorithm), given as a function of the elevation angles ($\theta_1, \ldots, \theta_N$) and the azimuth angles ($\varphi_1, \ldots, \varphi_N$), for the ensemble of synthetic antenna arrays defined by all data samples. Thus, the optimization of this cost function directly yields the estimated geographic location, i.e. without first estimating the individual directions to the sources:

$$p = [p_x \ p_y \ p_z]^T = \underset{\theta_1, \varphi_1, \theta_2, \varphi_2, \ldots, \theta_N, \varphi_N}{\mathrm{argmin}} g(\theta_1, \varphi_1, \theta_2, \varphi_2, \ldots, \theta_N, \varphi_N)$$

It should be understood that the cost function g does not need to be defined as a function of elevation and azimuth angles, but could instead be defined based on a so-called state space model for the relevant underlying process which, as explained above, is based on the array response of the synthetic antenna array. Thus, the cost function g may be defined to directly relate the estimated geographic location to the array response. It should also be realized that the minimization of a cost function is merely given as an example, and both the explicit triangulation and the inherent triangulation could involve optimization of other types of functions.

Explicit triangulation generally involves a lower mathematical and computational complexity, and it does not have to be designed for a predetermined number of available sources. If the minimization of the cost function f results in a majority of correctly estimated directions to the different sources, the explicit triangulation will be able to identify the geographic location of the apparatus as the intersection given by the majority of estimated directions. Typically, incorrectly estimated directions result from signal reflections, and thus originate from incoming signals of reduced signal strength. If the signals received from all sources have essentially equal (high) signal strength, the explicit triangulation might be suboptimal and it may be advantageous to use the inherent triangulation instead. The inherent triangulation does not estimate the directions to the sources sequentially, but instead the directions are embedded as parameters in an overall function (signal model) and the estimated geographic location is obtained by optimizing all angles collectively.

In one embodiment, the positioning process may actively switch between the inherent and explicit triangulation based on the signal strengths of the individual incoming signals and/or the number of available sources. As indicated above, there are numerous available synthetic/virtual antenna array algorithms that may be applied directly, or after modification, for directional estimation. Such algorithms include both beamforming algorithms and parameter estimation algorithms. Yet another simplified DOA algorithm for directional estimation is given below.

Consider an antenna with a single antenna element, and a receiver that is continuously receiving signals from N sources (base stations). The receiver (antenna) is moved in a volume and the received signals are sampled at the time instances $t_0, \ldots, t_{k-1}$. The local coordinates of the receiver (antenna) are determined at the time instances $t_0, \ldots, t_{k-1}$ using the motion detector. The sampled signal data, which may be measured in a sequential or parallel manner, is stored in a matrix $s \in \mathbb{C}^{N \times k}$, where each row $s_n$ contains k signal samples from source n. The local coordinates are stored in a matrix $x \in \mathbb{R}^{3 \times k}$. The (complex base band) signal from source n received at time instant $t_i$ is denoted $s_{ni}$, whereas the coordinate vector for this signal sample is $x_i \in \mathbb{R}^{3 \times 1}$. The signal samples are used to form a synthetic antenna array, which for each source n has an array response $$a_n(\theta, \varphi) = \exp\{-jk_{0n}x^Tk\}$$

where $\theta$ and $\varphi$ are the elevation and azimuth angles-of-arrival, respectively, $k = -[\cos \varphi \sin \theta \ \sin \varphi \sin \theta \ \cos \theta]^T$, $k_{0n} = 2\pi\lambda_n^{-1}$ and $\lambda_n$ is the (carrier) wavelength of the signal from source n. For each source n, the elevation and azimuth angles-of-arrival are derived from $$\{\hat{\theta}_n, \hat{\varphi}_n\} = \underset{\theta,\varphi}{\operatorname{argmin}}\left\{\frac{a_n(\theta, \varphi)^H s_n s_n^H a_n(\theta, \varphi)}{a_n(\theta, \varphi)^H a_n(\theta, \varphi)}\right\}$$

Figure 8:
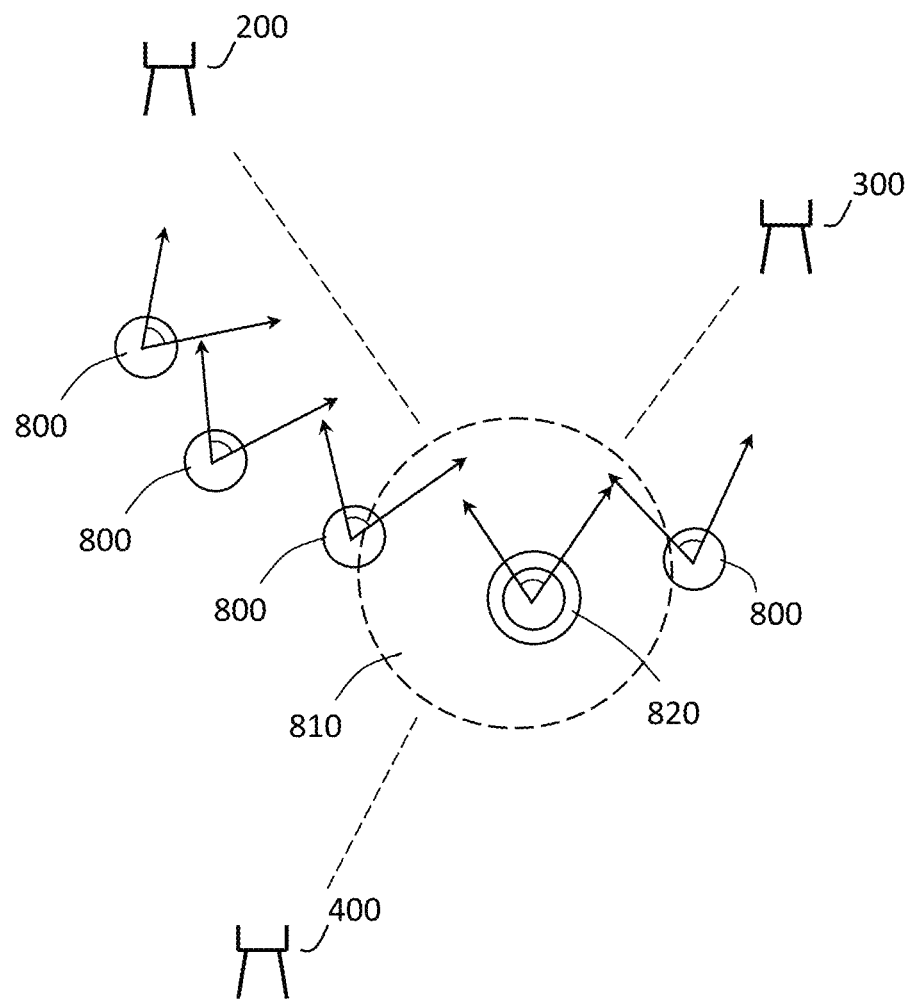
FIG. 8 is an illustration of a correlation between positioning by means of a synthetic array and a time of arrival calculation.

FIG. 8 shows a scenario that illustrates one way of combining directional estimation obtained from the array response, with a time difference measurement. In this scenario the direction between apparatus 100 and the two base stations 200 and 300 respectively, has been calculated from the array response. This means that also the angle between those directions can be assessed. However, as illustrated, this only narrows down the possible locations 800 at which the apparatus 100 may be, since the criteria of those directions and the angle are satisfied from numerous locations 800 if no direction to a third base station 400 can be obtained. In the example given in the drawing, a calculated position 810 given from a time difference calculation is correlated with the direction estimation. Preferably, an OTDOA measurement made by the apparatus on a PRS signal, and reported in a measurement signal to the network, is used for this purpose. This correlation may yield a result that the determined location of the apparatus 100 is that of position 820. The illustrated example is based on the position 810 obtained from the OTDOA calculation is a result of measured time difference from three base stations 200, 300, 400. However, it should be noted that even an OTDOA measurement from only one or two base stations may be sufficient to improve the positioning obtained from the array response.

Figure 9:
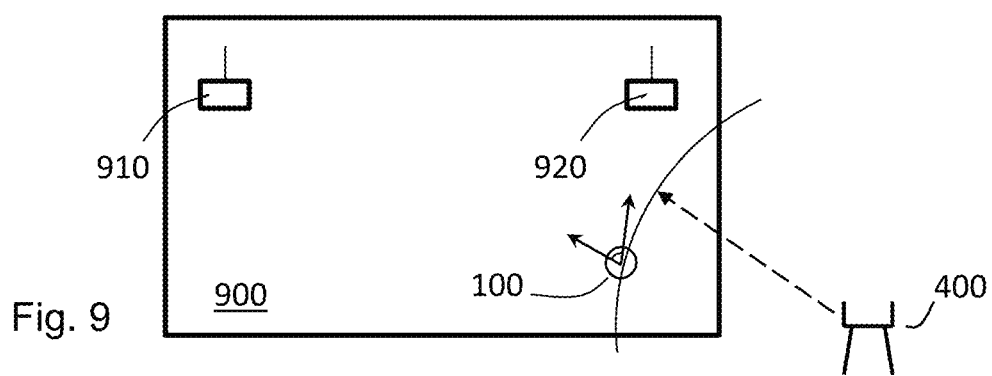
FIG. 9 shows an example of positioning by means of direction estimation from wireless access points, improved by correlation with a cellular base station time difference measurement.

In one embodiment, as shown in FIG. 9, the calculation of directions from the array response as described herein, is obtained from signals transmitted from WLAN access points, 910, 920, e.g. within a building 900. Since there may be a lot of reflections within a building, and the exact location of all wireless access points may not be known, the scenario that a sufficiently accurate positioning of the apparatus 100 is not possible may occur. In such a scenario it may also be beneficial to correlate the estimated direction to one or more access points 910 and/or 920, or a position calculated from such estimated direction, with a position obtained from an OTDOA measurement made on an LTE PRS signal. In the example shown in FIG. 9, an OTDOA measurement carried out in apparatus 100 from a PRS from a base station 400, and reported to the network, provides at least a range of possible distances from that base stations 400. By correlating the direction, or position, data obtained by the array response from the access points 910 and 920 with the theoretical trajectory satisfying the distance measurement to the base station 400, an improved positioning of the apparatus 100 is possible.

Figure 10:
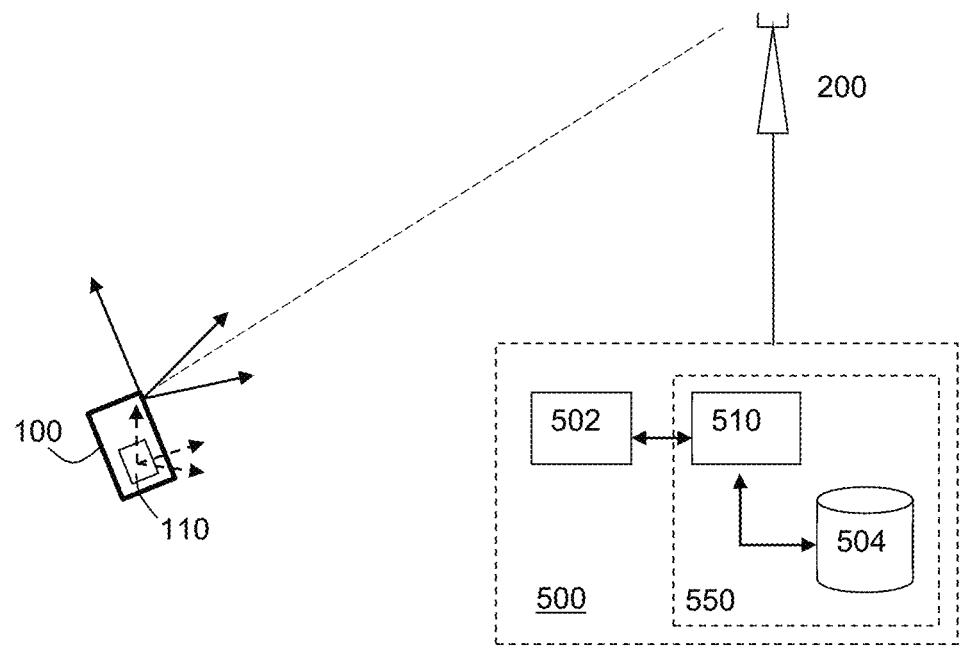
FIG. 10 shows an example of positioning by means of direction estimation and distance estimation, based on signalling with only one network transmitter.

FIG. 10 shows another embodiment, in which the geographic position of an apparatus 100 is determined The apparatus 100 may comprise the elements referred to with reference to FIG. 1, but for the sake of convenience only the motion detector 110 is shown. In this embodiment, the motion detector 110 comprises an orientation detector, configured to detect the relative orientation of the apparatus 100, with respect to the earth. The motion detector 110 may thus comprise a magnetometer for providing compass information. Furthermore, the motion detector may comprise one or more accelerometers, to obtain a reference to the earth's gravitational direction. So, by means of the motion detector 110, the relative rotational position in space between a local coordinate system (arrows with full lines) and a global reference coordinate system XYZ (arrows with dotted lines) can be determined In the same manner as was described with reference to FIG. 1, the apparatus 100 is configured to obtain a data set by receiving and sampling a signal from a network transmitter 200, at different time points while the apparatus 100 is moved along an arbitrary trajectory. The sampling results in a set of spatial measurement points, where each measurement point represents at least the phase of the signal, as sampled at the respective time point. Concurrent with the sampling of the signal, positional data is obtained from the motion detector 110. The positional data indicate the relative or absolute location of the apparatus 100 in a local coordinate system, for each measurement point m1-m18. Furthermore, the motion detector 110 outputs orientation data, regarding the relative rotational position between the local coordinate system and a global coordinate system XYZ.

A measurement signal may thereafter be generated, and transmitted from the apparatus 100 to the network, typically to the currently serving base station or access point. For each transmitted radio signal, the measurement signal may comprise a plurality of data samples, such as m1-m18, or $(m_{1,1}, m_{2,1}, m_{3,1})$ to $(m_{1,3}, m_{2,3}, m_{3,3})$, obtained in the apparatus from the respective transmitted signal at different time points during a measurement period with movement. The measurement signal may also comprise local position data associated to each data sample obtained from a local positioning unit in the electronic device, and orientation data for each point. Alternatively, the position data of the measurement signal is given with reference directly to the global coordinate system XYZ. The apparatus 100 is further configured to measure distance data from a signal transmitted from a network transmitter 200, indicated by the dashed line. The distance data may e.g. comprise a timing value, and/or a signal strength value, of the signal received in the apparatus 100. This distance data may also form part of the measurement signal. Alternatively, the distance data is transmitted separately from the data samples and their respective position data. In an alternative embodiment, the distance data may be measured by the network transmitter 200, on a signal transmitted from the apparatus 100, e.g. on a signal transmitted from the apparatus 100 in response to a signal received from the network transmitter 200. The distance data and the position data for the samples are preferably independent of each other. More specifically, the relative positions for the samples need not take into account the distance data. In other words: the signal of all data samples are deemed to originate from the same distance to the so as to form a synthetic antenna array. Further processing of the sample data and the distance data is then preferably performed in the network, such as in a node 500 connected to the serving base station, whereby a measurement of the geographic location of the apparatus may be obtained. A benefit with this embodiment is that signals from only one network transmitter need to be sampled, for obtaining an estimation of the geographic position of the apparatus 100.

In a variant of this embodiment, a directional measurement using measurement data from the apparatus 100 may be used for improving assessment of its geographic position by the network, when triangulation is not possible. Standard triangulation in a network may be based on estimating the theoretical intersection of measured circles around network transmitters, based on propagation time measured to or from an apparatus 100. While three network transmitters are need for complete positioning in space, only signals from (or to) two network transmitters may be available, or sufficiently direct (along a line of sight) to be useful. A direction vector of a signal received in the apparatus 100 from one network transmitter 200, in accordance with the description of the embodiment of FIG. 10, may in such an embodiment be used for complementing the lack of signals from (or to) the third network transmitter.

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims. The benefit of performing the direction calculations in the network rather than in the apparatus to be positioned, is that the operator and network does not need to share the exact location of the base station with the apparatus. Furthermore it is also possible to combine this measurement with other measurements that can only be made available in the network to create hybrid location method, e.g. OTDOA measurements or similar that are not necessarily using angles. The hybrid location method will provide better accuracy.

The inventive concept is not limited to mobile phones but could be applied to any other type of portable electronic device, such as a laptop computer, a palmtop computer, a PDA (Personal Digital Assistant), a tablet computer, a sub-notebook computer, a netbook computer, a digital camera, a portable media player, a game console, a digital e-book reader, a digital radio apparatus, or any type of device with a signal receiving unit, a local positioning unit, and a processor or equivalent means for directional estimation and navigational positioning.

The invention claimed is:

1. A method, performed in a radio communications network, of determining the geographic location of a portable electronic device, comprising the steps of:
    transmitting a radio signal from a first network transmitter;
    receiving, in the network, a measurement signal from the portable electronic device, which measurement signal comprises, for the transmitted radio signal, i) a plurality of data samples obtained in the electronic device from the transmitted signal at different time points during a measurement period during which movement of the portable electronic device occurs, the data samples are taken with a sample period controlled to target a predetermined distance between locations of measurement points at which the data samples are obtained based on a determined speed of movement of the portable electronic device during the measurement period and ii) local position data associated to each data sample obtained from a local positioning unit in the electronic device, the data samples and local position data comprising a synthetic antenna array;
    determining, in the network, a direction measurement between the electronic device and the first network transmitter from the synthetic antenna array;
    obtaining geographic location data for the first network transmitter; identifying geographic location data of the portable electronic device based on the direction measurement and the geographic location data for the first network transmitter; and
    wherein the predetermined distance is selected to be less than one wavelength of the transmitted radio signal.

2. The method of claim 1, wherein the step of determining a direction measurement comprises the steps of
    obtaining an array response of the synthetic antenna array; and
    processing the synthetic antenna array as a function of the array response.

3. The method of claim 1, comprising the steps of:
    obtaining a distance measurement, based on a signal received in the apparatus from a second network transmitter, representing an estimated distance between the apparatus and said second network transmitter.

4. The method of claim 3, wherein the distance measurement is calculated from time difference data, received from the portable electronic device, representing time difference measured between specific signals from a number of network transmitters.

5. The method of claim 3, wherein the distance measurement is calculated from propagation time data, measured on a signal between the portable electronic device and the second network transmitter.

6. The method of claim 3, wherein the steps of obtaining a direction measurement and obtaining a distance measurement are carried out independently from each other.

7. The method of claim 4, wherein the step of identifying geographic location data comprises the step of correlating geographic location information obtained from processing the synthetic antenna array, with geographic location information determined from said time difference data.

8. The method of claim 1, comprising the step of
    receiving a relative rotational position of the apparatus with respect to a global coordinate system, wherein the step of identifying geographic location data of the portable electronic device is also based on said rotational position.

9. The method of claim 8, wherein said relative rotational position is received as compass data from the apparatus.

10. The method of claim 1, wherein the first network transmitter is a wireless access points.

11. The method of claim 1, wherein the first network transmitter is cellular base stations.

12. The method of claim 1, wherein said data samples include signal phase data for a plurality of physical antenna elements of the apparatus, taken at different time points.

13. The method of claim 12, wherein the synthetic antenna array comprises one virtual antenna element for each combination of one of said physical antenna elements and one of said time points.

14. The method of claim 2, wherein the array response is a model of at least the phase of the signal at the local positions as a function of the relative location between the synthetic antenna array and the transmitter.

15. The method of claim 1, wherein the step of processing the synthetic antenna array comprises optimizing a function that relates amplitude and phase of the signal at the local positions to the direction of arrival of the signal at the synthetic antenna array.

16. The method of claim 1, wherein the predetermined distance is selected to be ¼ wavelength of the transmitted radio signal.

17. A portable electronic device, comprising:
    a signal receiving unit including an antenna configured to receive a signal from at least one remote transmitter;
    a local positioning unit for determining a local position of the portable electronic device; and
    a processor, configured to obtain a plurality of data samples from the signal at different time points during a measurement period during which arbitrary movement of the portable electronic device occurs, associate each data sample with a local position obtained from the local positioning unit, the data samples and local position data comprising a synthetic antenna array, obtain an array response of the synthetic antenna array, and identify the geographic location of the portable electronic device by processing the synthetic antenna array as a function of the array response to determine a direction measurement between the electronic device and the at least one remote transmitter and by using knowledge about the geographic location of the at least one remote transmitter, wherein the data samples are taken with a sample period controlled to target a predetermined distance between locations of measurement points at which the data samples are obtained based on a determined speed of movement of the portable electronic device during the measurement period; and wherein the predetermined distance is selected to be less than one wavelength of the signal.

18. The portable electronic device of claim 17, wherein the antenna includes a plurality of antenna elements, and the processor is configured to obtain a data sample for each antenna element at each local position of the apparatus.

* * * * *